United States Patent [19]
Sieurin

[11] 3,893,657
[45] July 8, 1975

[54] METHOD FOR SEPARATING METAL WHICH ACCOMPANIES SLAG SKIMMED FROM A BATH OF MOLTEN METAL, AND A DEVICE FOR CARRYING OUT THE METHOD

[75] Inventor: Sven Ivar Sieurin, Upplands Vasby, Sweden

[73] Assignee: Granges Essem Aktiebolag, Vasteras, Sweden

[22] Filed: May 31, 1973

[21] Appl. No.: 365,744

[30] Foreign Application Priority Data
June 5, 1972 Sweden .............................. 7371/72

[52] U.S. Cl. ................................................. 266/37
[51] Int. Cl.[2] .............................................. C21C 21/00
[58] Field of Search .................. 75/24, 30; 266/37

[56] References Cited
UNITED STATES PATENTS

| | | | |
|---|---|---|---|
| 515,082 | 2/1894 | Iles | 75/24 |
| 1,522,765 | 1/1925 | Wilke | 266/37 |
| 2,324,938 | 7/1943 | Love | 266/37 |
| 2,699,933 | 1/1955 | Siefert | 266/37 |

*Primary Examiner*—Gerald A. Dost
*Attorney, Agent, or Firm*—Waters, Schwartz & Nissen

[57] ABSTRACT

A device and method for recovering metal accompanying slag skimmed from the surface of a bath of molten metal are described. The device has the form of a trough provided with a perforated bottom member, which is intended to be located at substantially the same level as the surface of the molten metal in the furnace. When using the device, slag is charged thereto and heated to a temperature which is at least equal to the temperature of the metal being treated. Whereupon any metal in the slag melts and runs down through the perforated bottom member of the device in the molten metal bath. Residual components of the slag are then removed from the device.

3 Claims, 1 Drawing Figure

3,893,657
PATENTED JUL 8 1975
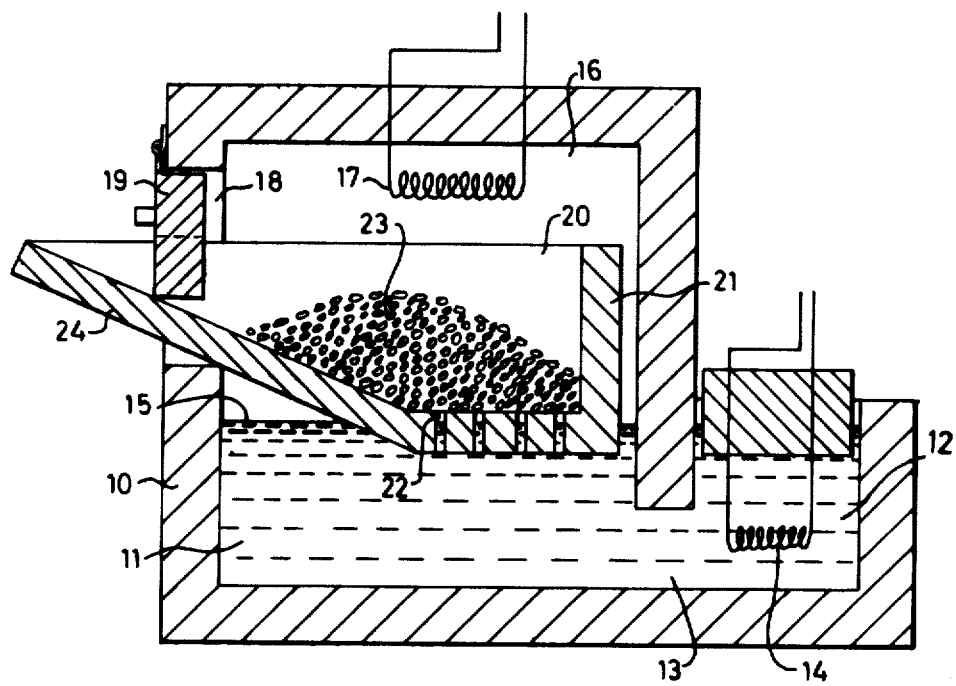

METHOD FOR SEPARATING METAL WHICH ACCOMPANIES SLAG SKIMMED FROM A BATH OF MOLTEN METAL, AND A DEVICE FOR CARRYING OUT THE METHOD

The present invention relates to a method of removing metal which accompanies slag skimmed from a bath of molten metal.

With such plants as melting furnaces and the like containing molten non-ferrous and ferrous metal there is usually formed on the surface of the molten metal a layer of slag consisting of slag forming impurities and metal oxides. The slag layer is liable to become relatively thick with time and hence the layer of slag is periodically removed from the surface of the molten metal by means of ladles, akimming doctors and the like and conducted away from the plant in question. When removing the slag in this way, it is impossible to avoid relatively large quantities of pure metal or metal alloy accompanying the slag, this portion of the pure metal or metal alloy being lost in the process. The quantity of metal accompanying the slag may, in time, reach substantial proportions by weight, especially in the case of large plants in which large quantities of molten metal are handled, which can lead to serious economic losses.

The object of the present invention is to improve the economic yield of such plants by separating from the skimmed slag the pure metal unintentionally removed therewith and recovering said metal, which is otherwise lost.

The present invention is mainly characterized by the fact that the skimmed slag is passed to a sieve and heated to at least the melting point of the metal, and that the molten metal is conducted away through the bottom of the sieve and the residue material removed therefrom.

The invention also relates to a device for carrying out the method, said device being mainly characterized in that the sieve comprises a trough having a perforated bottom and being arranged to be placed in a furnace.

The invention will now be described in more detail with reference to an embodiment thereof illustrated diagrammatically in the accompanying drawing, further features of the invention being made apparent in connection therewith.

The single FIGURE of the drawing is a vertical sectional view of a melting furnace which, in accordance with the invention, is preferably used for die-castable metals such as zinc, aluminium and its alloys.

In the drawing, the reference numeral 10 indicates generally a heavily heat-insulated furnace. The main space of the furnace 10 comprises a chamber 12 which communicates with the actual furnace through an opening 13 in the wall of the furnace 10, in a manner such that the molten metal 11 has the same surface level in both the furnace and the chamber. With the illustrated embodiment, the chamber 12 is used as a heating zone for the metal bath, the chamber being closed at the top thereof against outer air by means of a so-called floating lid of known type, the lid serving as a seal against the outer air and as a means for supporting a source of heat 14, such as an electric resistance element, for example, insulated in a suitable manner. The heat source is located at a substantial distance from the floating lid.

When the aforedescribed molten metal recovery furnace is connected to or forms part of a molten metal distribution system, e.g. a system for distributing metal to die-casting machines, the chamber may form part of or be connected to a system of passages for distributing molten metal to the feed portion of the system.

In the actual furnace portion 10, there is located above the surface 15 of the molten metal 11 a space 16 containing a suitable furnace atmosphere. This atmosphere is heated and kept heated by means of a suitable heat source 17, which also in this case is shown in the form of an electric resistance element but which is not restricted thereto. The temperature of the furnace atmosphere should be maintained at the same temperature or at approximately the same temperature as the molten metal 11, in order to obtain the best result.

The furnace is provided at one end thereof with a through passing opening 18 capable of being closed by means of a lid 19, which can be removed and replaced as desired. Extending through the opening 18 is a trough 20, which in the illustrated embodiment floats on the molten metal 11 to extend slightly below the surface thereof. The trough 20 has a bottom wall 21 in which a number of through passing holes 22 are disposed, the holes being intended to convey molten metal from the inside of the trough to the underlying melt 11. The trough is also provided with an inclined front wall 24 to facilitate charging of the trough with slag 23, which is shown resting on the bottom of the trough. When charging the trough, the lid 19 is removed and slag removed from a melting furnace or the like is emptied onto the inclined inner surface of the front wall 24 of the trough, whereupon the slag 23 slides under its own weight down the wall to take the position shown in the FIGURE. When charging of the trough is completed, the lid 19 is replaced, wherewith the furnace is fully heat insulated and insulated from the surrounding atmosphere. By applying the correct power or heat energy to the furnace atmosphere in the space 16, the temperature is elevated to a value which is suitably higher than the melting point of the metal being treated, whereby the atmosphere transfers its heat to the total quantity of slag 23, which is generally relatively porous. The heat thus applied to the slag causes metal which has accompanied the slag from the metal melting system in question to melt, wherewith the molten metal is collected in the bottom of the trough and flows through the holes 22 down into the melt 11. Since the furnace is closed, so that the atmosphere cannot freely enter the furnace, there is obtained a reduction in the extent to which oxides are formed on the metal in the slag as the metal melts and runs down into the melt 11. This is of great importance, if the process is to be as rewarding as possible and the maximum amount of metal recovered.

The trough 20 thus forms a kind of sieve and it is important that the slag in the trough 20 is held at a level located above the level of the molten metal 11 in the furnace, so that the residual material can be readily removed from the furnace subsequent to the entrained metal having been removed from the slag by melting.

It is also important that the trough is made from a material which is resistant to the molten metal at the temperatures in question and that its heat insulating or retention properties are sufficient to avoid unnecessary freezing of the metal when the charge is introduced into the furnace.

The invention is not restricted to the illustrated and described embodiment thereof, but can be modified within the scope of the following claims, thus, the trough need not necessarily float on the molten metal, but can be supported by other means which serve essentially the same purpose. Furthermore, the invention can be used to advantage with metals other than those capable of being die-cast.

I claim:

1. An apparatus for recovering metal from slag skimmed from the surface of a mass of molten metal, comprising a heat-insulated furnace, a basin in the bottom region of said furnace, capable of holding the mass of molten metal up to a desired level therein; said furnace defining therein a space containing an atmosphere above said basin; an opening provided through a wall of said furnace; closure means for said opening, for shielding the atmosphere in said space from the ambient atmosphere; a container placed in said space for receiving and collecting a batch of the skimmed slag entering through said opening; the bottom wall of said container having therein a number of through apertures, for leading the metal, recovered from the slag, in the molten state down into the mass of molten metal, while retaining a residual portion of the slag in said container; heating means in said space for keeping the atmosphere therein at a suitable temperature, for melting the metal contents out of the slag in said container, to flow through said apertures; and means for leading the molten metal away from said basin.

2. The device as defined in claim 1, wherein said perforated bottom is located substantially at the level of the surface of the molten metal in said furnace.

3. The device as defined in claim 2, wherein said trough is arranged to float on the molten metal.

* * * * *